United States Patent
Kreifeldt et al.

(10) Patent No.: US 11,799,312 B2
(45) Date of Patent: Oct. 24, 2023

(54) WEARABLE DEVICE CLEANING AND CHARGING DEVICE

(71) Applicant: IOT MED/DENT SOLUTIONS LLC, Park City, UT (US)

(72) Inventors: Richard Kreifeldt, Park City, UT (US); Robert Miller, Park City, UT (US); Juliana Miller, Park City, UT (US)

(73) Assignee: IOT MED/DENT SOLUTIONS LLC, Park City, UT (US)

( * ) Notice: Subject to any disclaimer, the term of this patent is extended or adjusted under 35 U.S.C. 154(b) by 451 days.

(21) Appl. No.: 16/985,488

(22) Filed: Aug. 5, 2020

(65) Prior Publication Data
US 2022/0045541 A1 Feb. 10, 2022

(51) Int. Cl.
| | |
|---|---|
| *H02J 7/00* | (2006.01) |
| *H02J 7/02* | (2016.01) |
| *H04L 67/12* | (2022.01) |
| *H02J 50/12* | (2016.01) |
| *H02J 50/20* | (2016.01) |
| *A61C 13/271* | (2006.01) |
| *G16Y 10/60* | (2020.01) |
| *G16Y 20/20* | (2020.01) |
| *A61C 7/08* | (2006.01) |

(52) U.S. Cl.
CPC ............... *H02J 7/02* (2013.01); *H02J 50/12* (2016.02); *H02J 50/20* (2016.02); *H04L 67/12* (2013.01); *A61C 7/08* (2013.01); *A61C 13/26* (2013.01); *G16Y 10/60* (2020.01); *G16Y 20/20* (2020.01)

(58) Field of Classification Search
CPC .. H02J 50/10; H02J 50/12; H02J 50/80; H02J 50/20; H02J 50/90; H02J 7/00034; H02J 7/0047; H02J 50/00; H02J 50/005; H02J 50/40; H02J 7/00304; H02J 7/00308; H02J 7/02; H02J 2310/23; H02J 50/001; H02J 7/0048; H02J 7/0029; H02J 7/00309; H02J 7/0042; H02J 50/402; H02J 50/70; H02J 13/00026; H01Q 1/245; H01Q 1/44; H01Q 9/42; H01Q 1/243; H01Q 13/10; H04B 5/0031; H04B 1/385; H04B 1/3888; H04B 5/0075; H04B 17/336; H04B 17/318; H04B 1/18; H04L 12/12; H04L 1/0045
USPC .................................................. 320/106–115
See application file for complete search history.

(56) References Cited

U.S. PATENT DOCUMENTS

| | | | |
|---|---|---|---|
| 2017/0045918 A1* | 2/2017 | Han ...................... G06F 1/1684 |
| 2017/0080251 A1* | 3/2017 | Yehezkel ................ H04M 1/17 |
| 2017/0082132 A1* | 3/2017 | Ota .......................... G08B 5/00 |
| 2019/0346306 A1* | 11/2019 | Jeong .................... G01J 1/0429 |

* cited by examiner

*Primary Examiner* — Binh C Tat
(74) *Attorney, Agent, or Firm* — Travis Banta; Loyal IP Law, PLLC

(57) ABSTRACT

The present disclosure relates to a device which charges and cleans a personal wearable device. The device includes a wireless charging circuit disposed within the device, and an ultraviolet light source disposed within the device. Further disclosed is a system which includes a device and a personal wearable device. The device includes a charging unit including wireless charging circuitry, and a cleaning unit including at least one ultraviolet light source; and a personal wearable device.

19 Claims, 2 Drawing Sheets

WEARABLE DEVICE CLEANING AND CHARGING DEVICE

BACKGROUND

In relatively modern history, personal wearable devices have been developed to assist people with ailments, injuries, and diseases as well as assisting with scheduling, directions, and personal tasks. For example, as glass became cheaper, the first primitive eyeglasses were developed in the 14$^{th}$ century to correct the sight of people with eye ailments. Immobilizing leg braces were as simple as sturdy sticks lashed to a person's leg to prevent movement of the knee or to provide weight bearing support for the braced leg. Further, some diseases were treated with medications stored in wearable containers to allow the user to always have medication on their person. More recently, pocket watches, digital watches, and now, smart watches, have been typically worn on the wrist or in a pocket to tell the user what time it is, to where they are navigating, and what tasks are to be done on a particular day. Other wearable devices are worn by sick or elderly people which summon help from emergency services in response to a button push.

One of the problems with wearable personal devices has always been becoming separated from the wearable personal devices. For example, eyeglasses left at home do not help a student see a chalk board during classroom instruction. Similarly, watches, hearing aids, personal locator beacons, and other personal wearable devices are subject to being lost, forgotten, or misplaced. Historically, these personal wearable devices were such an expense that a lost pocket watch, for example, would take months of salary to replace. More recently, many of these devices are still costly to simply replace when lost. One solution to this problem, which has been a fairly recent improvement with electronic devices, is position tracking of the device through a smart phone, for example. Hearing aids, for example, may be trackable through a computer or a smart phone when the hearing aids are pinged by the smartphone for location detection.

Unfortunately, location detection is not readily available on many devices for various reasons, such as location detection technology costs more to implement than replacement of the device would cost. Further, this type of location detection can only help a user find hearing aids when they have been lost by the user and then, only for as long as they maintain electrical power sufficient to power the hearing aids.

A further problem of personal wearable devices is that the human body becomes dirty between washings. Secretion of oils, perspiration, and dead skin, among other things, can be very difficult on electronics in a personal wearable device, not to mention on a housing of the personal wearable device itself. Personal wearable devices become dirty and unsanitary over time which requires cleaning. Alternatively, in one example, some devices which are worn internally to the human body, such as retainers, removable bridges, and dentures may be removed for eating, sleeping, cleaning, or for other reasons. Once outside of the wearer, internally worn personal devices may become unsanitary to replace in the user's mouth without vigorous cleaning. Unfortunately, cleaning is oftentimes not performed after, for example, dentures are removed for the night or after a retainer is removed for lunch. In today's world, such mistakes can cause serious danger to a person's wellness or may be potentially hazardous to a person's life.

Accordingly, it is one aspect of this disclosure to provide an electronic personal wearable device which may be sealed for automated cleaning. It is a further object of this disclosure to provide a cleaning unit which may provide device charging and cleaning either separately or simultaneously.

SUMMARY OF THE DISCLOSURE

Disclosed below is a device which charges and cleans a personal wearable device. The device includes a wireless charging circuit disposed within the device and an ultraviolet light source disposed within the device.

The present disclosure also relates to a system. The system includes a device which includes a wireless charging circuit and a cleaning unit including at least one ultraviolet light source. The system also includes a personal wearable device.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

In the following description of the disclosure, reference is made to the accompanying drawings, which form a part hereof, and in which is shown by way of illustration specific implementations in which the disclosure is may be practiced. It is understood that other implementations may be utilized and structural changes may be made without departing from the scope of the disclosure.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
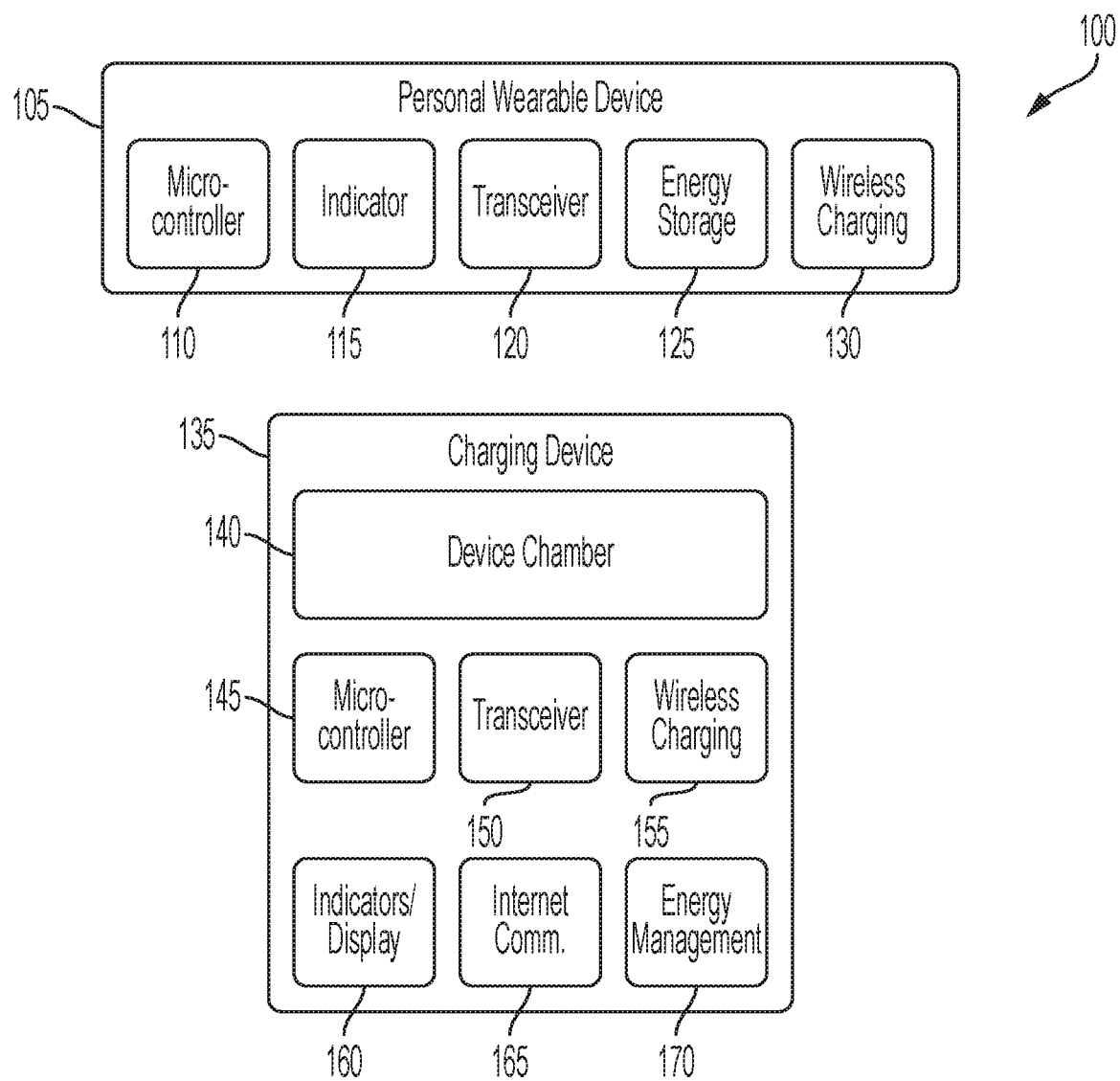
FIG. 1 illustrates a system including a personal wearable device and a charging device.

FIG. 1 illustrates a system 100 including a personal wearable device 105 and a charging device 135. An electronic personal wearable device may be used herein to identify any electronic wearable device. Examples of wearable personal devices may include electronic and non-electronic wearable devices. Examples of an electronic personal wearable device may include retainers for teeth, removable bridges, dentures, eyeglasses and hearing aids which are fitted with electronic devices described herein. Other non-electronic wearable devices may include an ankle brace or knee brace or any other wearable device, and may be integrated with electronics suitable to perform the function and features of personal wearable device 105 disclosed herein.

Personal wearable device 105 may include a microcontroller 110, an indicator 115, a transceiver 120, an energy storage 125, and wireless charging circuitry 130. Microcontroller 110 may include one or more hardware devices which may include hardware components such as a combination of processors, microcontrollers, busses, volatile and non-volatile memory devices, non-transitory computer readable memory devices and media, data processors, control devices, input devices, output devices, network interface devices, and other types of components that are apparent to those skilled in the art. Microcontroller 110 may execute pre-programmed instructions to perform functionalities described below.

Indicator 115 may be implemented simply as a light (e.g., a light emitting diode) or other display, or may be implemented as an audible indicator such as a piezoelectric speaker. Indicator 115 may operate by interfacing with a personal electronic device, such as a smart phone, tablet, laptop, or desktop computer, and may automatically connect with the personal electronic device to automatically communicate with the device and turn on the indicator which may allow the user to locate personal wearable device 105.

Personal wearable device 105 may further include a transceiver 120 which may operate to receive instructions and transmit information from personal wearable device 105. Transceiver 120 may include a number of hardware components such as transmitters, receivers, and antennas. Transceiver 120 may operate using any known network interface communication protocol, including NFC (Near Field Communication), RFID (RF ID tag), Wi-Fi, BLE (Bluetooth Low Energy), ZigBee, Z-Wave, RF (Radio Frequency), RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a 5G network, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between personal wearable device 105 and, for example, a smart phone/cloud based service or charging device 135. Transceiver 120 may or may not be implemented within microcontroller 110 and may or may not be implemented on a single silicon chip.

Energy storage 125 may provide electrical power to other components within personal wearable device 105, such as microcontroller 110, indicator 115, and transceiver 120. Energy storage 125 may be implemented as a battery, a super-capacitor, or any other electricity storage method. In one embodiment, a super-capacitor may be implemented within personal wearable device 105 using various layers that make up the body of the specific personal wearable device. For example, a personal wearable device 105 may be a retainer, which is worn in the mouth and is used to retain teeth in a particular location in the mouth, especially after orthodontic treatment. Thus, in the case of a retainer, a super capacitor may be built into the retainer by using, in order, at least a biocompatible plastic layer, an electrically conductive layer, an insulating plastic layer, an electrically conductive layer, and a biocompatible plastic. Such an organization of various layers of personal wearable device 105 may be similarly implemented in eyeglasses, removable bridges, dentures, hearing aids, or any other wearable personal electronic device.

Wireless charging circuitry 130 may be implemented using a tightly-coupled electromagnetic inductive coil, a radiative electromagnetic resonant charging circuit, or an uncoupled RF charging. Further, wireless charging circuitry 130 may harvest energy using heat from a person's mouth when installed using thermoelectric or thermionic principles, ambient RF energy, or piezoelectric devices. Wireless charging circuitry 130 may be connected to energy storage 125 and may serve to supply energy to energy storage 125 for storage. Wireless charging circuitry 130 may, under other conditions, also be directly connected to microcontroller 110, indicator 115, and transceiver 120 to provide electrical energy directly to microcontroller 110, indicator 115, and transceiver 120 when, for example, energy storage 125 is depleted of electrical potential or has stored its maximum electrical potential.

Charging device 135 may include a device chamber 140, a microcontroller 145, a transceiver 150, a wireless charging circuit 155, indicators or a display 160, Internet communication circuitry 165, and energy management circuitry 170.

Device chamber 140 may be an area within charging device 135 within which personal wearable device 105 may be entirely contained. For example, charging device 135 may provide a lid which opens to allow personal wearable device 105 to be deposited inside device chamber 140 and which closes to contain personal wearable device 105 within device chamber 140.

Charging device 135 may further implement a microcontroller 145 which may include one or more hardware devices which may include hardware components such as a combination of processors, microcontrollers, busses, volatile and non-volatile memory devices, non-transitory computer readable memory device and media, data processors, control devices, input devices, output devices, network interface devices, and other types of components that are apparent to those skilled in the art. Microcontroller 145 may execute pre-programmed instructions to perform functionalities described below.

Transceiver 150 may further operate to receive instructions and transmit information from personal wearable device 105. Transceiver 150 may include a number of hardware components such as transmitters, receivers, and antennas. Transceiver 150 may operate using any known network interface communication protocol, including NFC (Near Field Communication), RFID (RF ID tag), Wi-Fi, BLE (Bluetooth Low Energy), ZigBee, Z-Wave, RF (Radio Frequency), RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a 5G network, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, any type of satellite or cellular network, or any other appropriate protocol to facilitate communication between personal wearable device 105 and, for example, a smart phone/cloud based service or charging device 135. Transceiver 150 may or may not be implemented within microcontroller 145 and may or may not be implemented on a single silicon chip.

Wireless charging circuitry 155 may be implemented using wireless charging circuitry that is complimentary to wireless charging circuitry 130 disclosed above, which may include a tightly-coupled electromagnetic inductive coil, a radiative electromagnetic resonant charging circuit, or an uncoupled RF charging. Wireless charging circuitry 155 may transmit electrical charge to personal wearable device 105 through wireless charging circuitry 130.

Charging device 135 may further include one or more indicators or a display 160 which may allow a user to interface with charging device 135. For example, display 160 may provide an indication of charging status, an indication of a duration of wireless charging, a relative charge level of energy storage 125, an expected duration of a wireless charging session, a remaining charge time for energy storage 125, and may provide other information to both receive and output information to or from a user. Display 160 may be a touch screen to allow the user to provide instructions to begin charging personal wearable device 105.

Charging device 135 may further include Internet communication circuitry 165 which may allow charging device 135 to connect to cloud based services or a smart phone using any of the communication protocols disclosed herein. For example, NFC (Near Field Communication), RFID (RF ID tag), Wi-Fi, BLE (Bluetooth Low Energy), ZigBee, Z-Wave, RF (Radio Frequency), RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a 5G network, a Worldwide Interoperability for Microwave Access (WiMAX) network, a Long Term Evolution (LTE) network, Code-Division Multiple Access (CDMA) network, Wideband CDMA (WCDMA) network, or any other appropriate protocol to facilitate communication may be used to allow charging device 135 to interface with another electronic device. Information such as an indication of charging status, an indication of a duration of wireless charging, a relative charge level of energy storage 125, an expected duration of a wireless charging session, a remaining charge time for energy storage 125 may be provided to a user's smart phone or other personal electronic device by Internet communication circuitry 165.

Charging device 135 may further include energy management circuit 170 which applies an appropriate amount of electrical energy to wireless charging circuit 155 to allow wireless charging circuit 155 to provide electrical energy to wireless charging circuit 130 and fill energy storage 125 in personal wearable device 105. Energy management circuit 170 may monitor, directly or by microcontroller 145 and transceivers 120/150, a level of charge of energy storage 125 such that energy storage 125 is not over or under charged when a charging cycle is completed.

In use, a user may wear personal wearable device 105, such as a retainer. The user may be required to wear the retainer at all times with the exception of eating. Since many people who wear retainers may be relatively young and not appreciate the monetary cost of making a retainer, such users may be less careful about where the retainer is placed. During school lunch, a user may remove their retainer to eat their meal and set the retainer on a lunch tray to eat lunch. The hypothetical youthful user of the retainer may attempt to rush through lunch to join friends outside for a recess period at school and inadvertently place the retainer in the trash with the leftovers of the lunch without realizing the retainer has been placed in the trash.

For purposes of this discussion, the user may be notified by a smartphone, that the retainer has left the proximity of the smartphone (e.g. the user's person). Functionally, the smartphone may, via an installed application, detect that the smartphone is no longer receiving, for example, an NFC signal from RF transceiver 120 and cause, as a result, a notification to be provided to the user by the smartphone that the retainer has been misplaced, at the time the user has misplaced the retainer. Should the user not notice the indication that the retainer has been misplaced, the application on the smart phone may provide the user with an indication of a last known location of the retainer which may identify where the retainer was lost and provide left, right, and distance directions to recover the retainer. When the smartphone reconnects with the retainer via transceiver 120, indicator 115 may be actuated to provide an indicator of the precise location of the retainer to allow the retainer to be retrieved.

At the end of the day, for example, personal wearable device 105 may require charging. The user may dispose personal wearable device 105 within device chamber 140 of charging device 135. Charging device 135 may then wirelessly connect to personal wearable device 105 both for electrical charging through wireless charging circuits 130/155 and for information exchange through transceivers 120/150 with personal wearable device 105. If energy storage 125 is low enough that personal wearable device 105 lacks sufficient electrical power to connect for information exchange, personal wearable device 105 may connect for information exchange when energy storage 125 is supplied with enough electricity to operate personal wearable device 105. While personal wearable device 105 is charging, information may be obtained from personal wearable device 105, such as information stored in a memory device that may or may not be included within microcontroller 110 by charging device 135 through transceivers 120/150. Information provided from personal wearable device 105 may include an indication of wear time for personal wearable device 105 (e.g., wear time tracking) through one or more sensors included within personal wearable device 105. This information may be provided to a smartphone or to a cloud service and shared with, for example, parents, an orthodontist, and orthodontic staff. The orthodontist or orthodontic staff may use this information to assess whether or not a patient, such as a young school student, is wearing personal wearable device 105 for an optimal amount of time.

Figure 2:
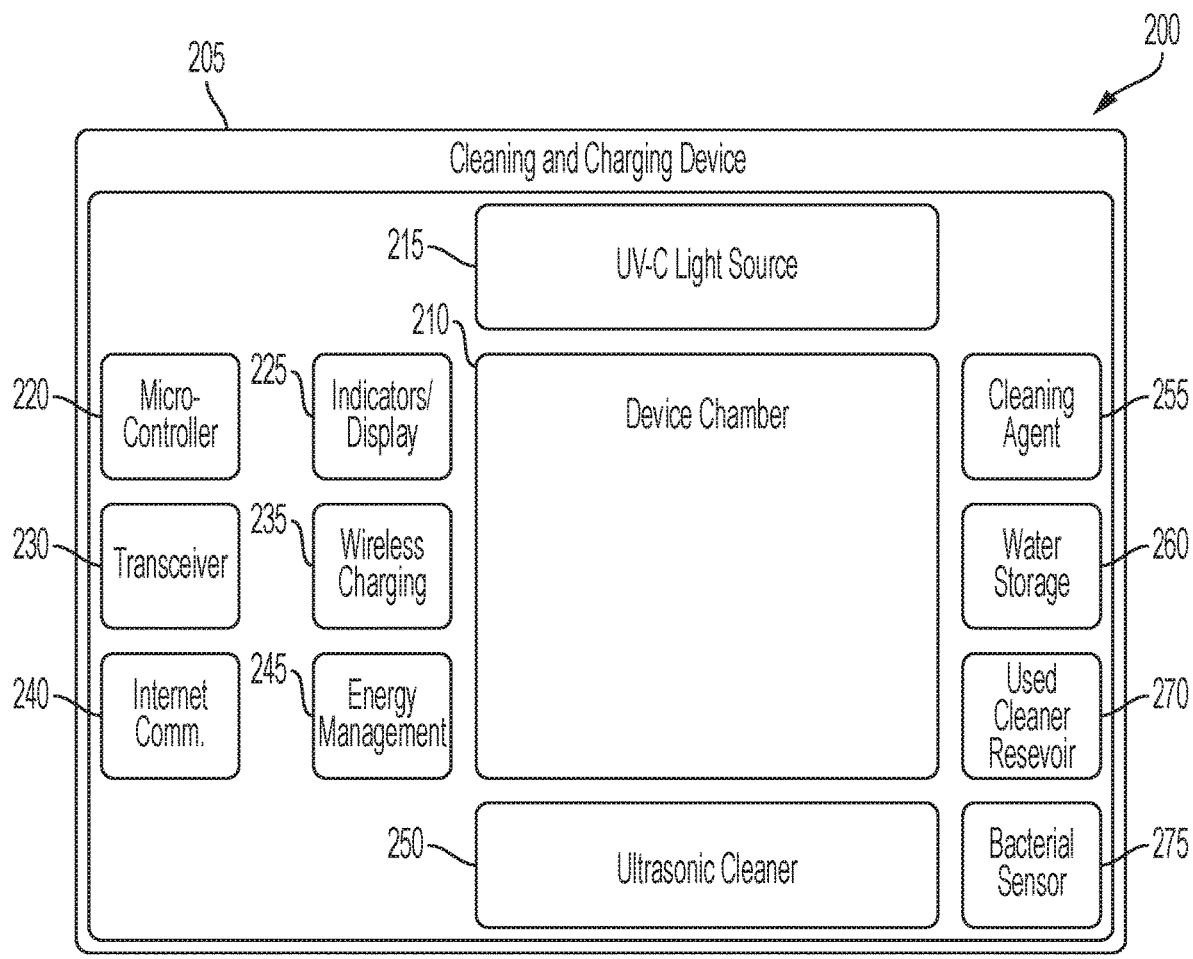
FIG. 2 illustrates a cleaning and charging device.

FIG. 2 illustrates a cleaning and charging device 205 which may be usable with system 200, which may include personal wearable device 105. Personal wearable device 105 and its constituent components may be referred to in this disclosure with respect to FIG. 1.

Cleaning and charging device 205 may include a device chamber 210, an ultraviolet light source 215, microcontroller 220, an indicator/display 225, a transceiver 230, a wireless charging circuit 235, Internet communication circuitry 240, energy management circuitry 245, an ultrasonic cleaner 250, a cleaning agent reservoir 255, a water storage reservoir 260, a used cleaner reservoir 270, and a bacterial sensor 275.

Device chamber 210 may be an area within cleaning and charging device 205 within which personal wearable device 105 may be entirely contained. For example, cleaning and charging device 205 may provide a lid which opens to allow personal wearable device 105 to be deposited inside device chamber 210 and which closes to contain personal wearable device 105 within device chamber 210.

Cleaning and charging device 205 may further include a light source 215, such as an ultraviolet light source, which may be implemented using a light emitting device, such as a light emitting diode. It has been discovered that bacteria, viruses, and other microorganisms are sensitive to light in the ultraviolet portion of the electromagnetic spectrum and in particular, the UV-C portion of the ultraviolet portion of the electromagnetic spectrum. Thus, when a personal wearable device 105 is installed within device chamber 210, an ultraviolet light may be applied to or emitted onto personal wearable device 105 for a duration of time that is sufficient to kill bacteria, viruses, and other microorganisms that may be disposed on an exterior surface of personal wearable device 105. Ultraviolet light may sanitize or sterilize personal wearable device 105 according to the duration of time ultraviolet light is applied and the intensity of the ultraviolet light during application.

Cleaning and charging device 205 may further implement a microcontroller 220 which may include one or more hardware devices which may include hardware components such as a combination of processors, microcontrollers, busses, volatile and non-volatile memory devices, non-transitory computer readable memory device and media, data processors, control devices, input devices, output devices, network interface devices, and other types of components that are apparent to those skilled in the art. Microcontroller 220 may execute pre-programmed instructions to perform functionalities described herein. For example, microcontroller 220 may perform an algorithm in response to initiating cleaning and charging device simultaneously or sequentially. Alternatively, microcontroller 220 may execute just a cleaning cycle or just a charging cycle on personal wearable device 105. Further, microcontroller 220 may perform a cleaning cycle, for example, as discrete steps in a cleaning cycle. For example, a cleaning cycle may be performed by an algorithm executed by microcontroller 220 and may include one or more of a step of applying an ultraviolet light for a specified or predetermined period of time, actuating an ultrasonic cleaner for a specified or predetermined period of time, dispensing a specified or predetermined amount of cleaning agent, dispensing a specified or a predetermined amount of water. Microcontroller 220 may also cause a charging cycle may be performed during, before, or after any one or more of the discrete steps in a cleaning cycle.

Cleaning and charging device 205 may further include one or more indicators or a display 225 which may allow a user to interface with cleaning and charging device 205. For example, display 225 may provide an indication of charging status for personal wearable device 105, an indication of a duration of wireless charging for personal wearable device 105, a relative charge level of energy storage 125, an expected duration of a wireless charging and/or cleaning session for personal wearable device 105, a remaining charge time for energy storage 125, an estimated remaining cleaning time for personal wearable device 105, and may provide other information to both receive and output information to or from a user. Display 225 may be a touch screen to allow the user to provide instructions to begin charging or cleaning personal wearable device 105.

Transceiver 230 may further operate to receive instructions and transmit information from personal wearable device 105. Transceiver 230 may include a number of hardware components such as transmitters, receivers, and antennas. Transceiver 230 may operate using any known network interface communication protocol, including NFC (Near Field Communication), RFID (RF ID tag), Wi-Fi, BLE (Bluetooth Low Energy), ZigBee, Z-Wave, RF (Radio Frequency), RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a 5G network, a Worldwide Interoperability for Microwave Access (WiMAX) network, a Long Term Evolution (LTE) network, Code-Division Multiple Access (CDMA) network, Wideband CDMA (WCDMA) network, or any other appropriate protocol to facilitate communication between personal wearable device 105 and, for example, a smart phone/cloud based service or cleaning and charging device 205. Transceiver 230 may or may not be implemented within microcontroller 220 and may or may not be implemented on a single silicon chip.

Wireless charging circuitry 235 may be implemented using wireless charging circuitry that is complimentary to wireless charging circuitry 130 disclosed above, which may include a tightly-coupled electromagnetic inductive coil, a radiative electromagnetic resonant charging circuit, or an uncoupled RF charging. Wireless charging circuitry 235 may transmit electrical charge to personal wearable device 105 through wireless charging circuitry 235.

Cleaning and charging device 205 may further include Internet communication circuitry 240 which may allow cleaning and charging device 205 to connect to cloud based services or a smart phone using any of the communication protocols disclosed herein. For example, NFC (Near Field Communication), RFID (RF ID tag), Wi-Fi, BLE (Bluetooth Low Energy), ZigBee, Z-Wave, RF (Radio Frequency), RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a 5G network, a Worldwide Interoperability for Microwave Access (WiMAX) network, a Long Term Evolution (LTE) network, Code-Division Multiple Access (CDMA) network, Wideband CDMA (WCDMA) network, or any other appropriate protocol to facilitate communication may be used to allow cleaning and charging device 205 to interface with another electronic device. Information such as an indication of charging status, an indication of a duration of wireless charging, a relative charge level of energy storage 125, an expected duration of a wireless charging session, a remaining charge time for energy storage 125, an expected duration for cleaning for personal wearable device 105, an estimated time remaining for a duration of cleaning, and other information, may be provided to a user's smartphone or other personal electronic device by Internet communication circuitry 240.

Cleaning and charging device 205 may further include energy management circuit 245 which applies an appropriate amount of electrical energy to wireless charging circuit 235 to allow wireless charging circuit to provide electrical energy to wireless charging circuit 130 and fill energy storage 125 in personal wearable device 105. Energy management circuit 245 may monitor, directly or by microcontroller 145 and transceivers 120/230 a level of charge of energy storage 125 such that energy storage 125 is not over or under charged when a charging cycle is completed.

Cleaning and charging device 205 may further include an ultrasonic cleaner 250 which may use ultrasonic vibrations to agitate a cleaning agent from cleaning agent reservoir 255, and water from water storage 260 against a surface of personal wearable device 105 to sanitize or sterilize personal wearable device 105. Ultrasonic cleaner 250 includes a motor which vibrates at a particular frequency suitable for agitating a cleaning agent, water, and a surface of personal wearable device 105, which is known to provide suitable agitation for cleaning personal wearable device 105 to the point where personal wearable device 105 is sanitized and/or sterilized.

Cleaning agent reservoir 255 and water storage reservoir 260 may provide a measured or pre-identified amount of each of cleaning agent and water, respectively, to submerge personal wearable device 105 within device chamber 210. Device chamber 210 may further include a drain and, optionally, a pump which allows water and cleaning agent to drain into a used cleaner reservoir 270.

Cleaning and charging device 205 may further include a bacterial sensor 275 which may function as either an optical sensor or a biological sensor to detect bacteria disposed on personal wearable device 105 or within used cleaner reservoir 270. Following the assumption that used cleaner reservoir 270 cleaned all bacteria, viruses, and microorganisms from personal wearable device 105, bacterial sensor 275 may test fluid within used cleaner reservoir 270 to assess an amount of biological contamination that was removed from personal wearable device 205. Bacterial/virus/microorganism counts may be made and information representative of a number of bacteria/viruses/microorganisms may be provided to a cloud server via Internet communication circuit 240. Optical scans of bacterial contamination of personal wearable device 105 may also be performed before and after cleaning to compare bacterial contamination levels before and after cleaning and to identify a degree of cleaning performed. Microcontroller 220 may receive information including bacteria/virus/microorganism (e.g., contaminant) data contained in the used cleaner reservoir after a first cleaning cycle and cause a second cleaning cycle to be performed and compare contaminant data after a cleaning cycle washing to contaminant data received after a second cleaning cycle. Microcontroller 220 may then assess contaminant data from bacterial sensor 275 from either the personal wearable device 105 or fluid within used cleaner reservoir 270 to determine whether or not the contaminant data detected fewer or no contaminants in a second cleaning cycle than in the first cleaning cycle. In other words, microcontroller 220 may compare contaminant data from various cleaning cycles or even between discrete steps of the cleaning cycle, to ascertain whether or not personal wearable device 105 is clean, sanitized, or sterilized. Bacterial sensor 275 may further provide contaminant data to microcontroller 220 which causes microcontroller 220 to adjust a duration of time for a cleaning cycle or one or more discrete steps of a cleaning cycle (e.g., extend/shorten an ultraviolet light application period or extend/shorten application of an ultrasonic cleaner).

In use, a user may wear personal wearable device 105, such as a retainer, for example. At the end of the day, for example, personal wearable device 105 may require charging and cleaning. The user may dispose personal wearable device 105 within device chamber 210 of cleaning and charging device 205. Cleaning and charging device 205 may then wirelessly connect to personal wearable device 105 both for electrical charging through wireless charging circuits 130/235 and for information exchange through transceivers 120/230 with personal wearable device 105. If energy storage 125 is low enough that personal wearable device 105 lacks sufficient electrical power to connect for information exchange, personal wearable device 105 may connect for information exchange when energy storage 125 is supplied with enough electricity to operate personal wearable device 105. While personal wearable device 105 is charging, information may be obtained from personal wearable device 105, such as information stored in a memory device that may or may not be included within microcontroller 220 by cleaning and charging device 205 through transceivers 120/235. Information provided from personal wearable device 105 may include an indication of wear time for personal wearable device 105 (e.g., wear time tracking) through one or more sensors included within personal wearable device 105. This information may be provided to a smartphone or to a cloud service (e.g., one or more cloud computing servers) and shared with, for example, parents, an orthodontist, and orthodontic staff. The orthodontist or orthodontic staff may use this information to assess whether or not a patient, such as a young school student, is wearing personal wearable device 105 for an optimal amount of time.

Cleaning and charging device 205 may further perform a cleaning cycle on personal wearable device 105. The cleaning cycle may be performed before, after, or simultaneously with the charging of personal wearable device 105, described above. A cleaning cycle may include exposing personal wearable device 105 to ultraviolet light through ultraviolet light source 215 for a duration of time. The cleaning cycle may further include applying a cleaning agent and water from cleaning agent reservoir 255 and water storage reservoir 260 in sufficient combined quantity to submerge personal wearable device 105 within device chamber 210. The cleaning cycle may further include actuating an ultrasonic cleaner 250 to agitate the cleaning agent and the water to sanitize and/or sterilize personal wearable device 105 for a duration of time. Once the duration of time for ultrasonic cleaning has elapsed, device chamber 210 may be drained into a used cleaner reservoir 270. Finally, bacterial sensor 275 may obtain a count for a number of bacteria/viruses/microorganisms either cleaned from personal wearable device 105 or within fluid in used cleaner reservoir 270. Cleaning and charging device 205 may then communicate the count to one or more cloud computing servers for tracking.

At such a point, cleaning and charging device 205 may have finished sanitizing/sterilizing personal wearable device 105. If another personal wearable device 105 also requires cleaning, personal wearable device 105 may communicate with cleaning and charging device 205 to log that a different device is entering a cleaning and charging cycle such that information tracking will be consistent for each device.

The foregoing description has been presented for purposes of illustration. It is not exhaustive and does not limit the invention to the precise forms or embodiments disclosed.

Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A charging and cleaning device, comprising:
   a wireless charging circuit disposed within the charging and cleaning device,
   an artificial ultraviolet light source disposed within the charging and cleaning device;
   a personal wearable device chamber disposed within the charging and cleaning device;
   wherein the ultraviolet light source is disposed within the charging and cleaning device near the personal wearable device chamber; and
   wherein the wireless charging circuit and the artificial ultraviolet light source are simultaneously functionable.

2. The charging and cleaning device of claim 1, wherein the artificial ultraviolet light source is a UV-C light source.

3. The charging and cleaning device of claim 1, wherein the wireless charging circuit includes an inductive coil.

4. The charging and cleaning device of claim 1, wherein the wireless charging circuit is a radiative electromagnetic resonant charging circuit.

5. The charging and cleaning device of claim 1, wherein the wireless charging circuit uses uncoupled radio frequency charging.

6. The charging and cleaning device of claim 1, further comprises:
   an ultrasonic cleaner disposed within the charging and cleaning device near the personal wearable device chamber.

7. The charging and cleaning device of claim 1, further comprises:
   one or more reservoirs disposed within the charging and cleaning device near the personal wearable device chamber.

8. The charging and cleaning device of claim 7, wherein the one or more reservoirs comprise a cleaning agent reservoir, a water storage reservoir, and a used cleaner reservoir.

9. The charging and cleaning device of claim 1, further comprises:
   a bacterial sensor.

10. The charging and cleaning device of claim 1, wherein a personal wearable device when placed in the personal wearable device chamber is charged and cleaned simultaneously within the charging and cleaning device.

11. The charging and cleaning device of claim 1, further comprises:
    an energy management circuit.

12. The charging and cleaning device of claim 1, further comprises:
    a display.

13. The charging and cleaning device of claim 1, further comprises:
    a transceiver.

14. The charging and cleaning device of claim 13, wherein the transceiver receives information from a personal wearable device and transmits the information to a cloud server through Internet communication circuitry.

15. The charging and cleaning device of claim 13, further comprises:
    an internet communication circuitry which transmits information generated by the device during one or more of a charging cycle and a cleaning cycle to a cloud computing server.

16. The charging and cleaning device of claim 15, wherein the information generated by the device during one or more of a charging cycle and a cleaning cycle includes contaminant data.

17. A system comprising:
    a charging and cleaning device, comprising:
       a charging unit including wireless charging circuitry, and
       a cleaning unit including at least one artificial ultraviolet light source disposed within the charging and cleaning device;
       a personal wearable device chamber disposed within the charging and cleaning device;
       wherein the ultraviolet light source is disposed within the charging and cleaning device near the personal wearable device chamber;
       wherein the wireless charging circuit and the artificial ultraviolet light source are simultaneously functionable; and
    a personal wearable device sized to fit within the personal wearable device chamber.

18. The system of claim 17, wherein the personal wearable device includes an energy storage.

19. The system of claim 17, where in the charging and cleaning device further comprises:
    an ultrasonic cleaner.

* * * * *